United States Patent
Lad et al.

(10) Patent No.: US 9,706,107 B2
(45) Date of Patent: Jul. 11, 2017

(54) CAMERA VIEW CONTROL USING UNIQUE NAMETAGS AND GESTURES

(71) Applicant: Avaya Inc., Basking Ridge, NJ (US)

(72) Inventors: Satyam Lad, Pune (IN); Narendra Limbani, Pune (IN); Parag Mulay, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/797,797

(22) Filed: Jul. 13, 2015

(65) Prior Publication Data

US 2017/0019632 A1   Jan. 19, 2017

(51) Int. Cl.
| | |
|---|---|
| *H04N 7/15* | (2006.01) |
| *H04N 5/232* | (2006.01) |
| *H04M 3/56* | (2006.01) |
| *H04N 7/14* | (2006.01) |

(52) U.S. Cl.
CPC ........ *H04N 5/23216* (2013.01); *H04M 3/567* (2013.01); *H04N 5/23206* (2013.01); *H04N 5/23296* (2013.01); *H04N 7/147* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,769,586 | B2 * | 8/2010 | Bennett | G06F 17/24 704/2 |
| 7,920,158 | B1 * | 4/2011 | Beck | H04N 5/23219 348/14.08 |
| 7,970,598 | B1 * | 6/2011 | Flanagan | G06F 17/289 704/2 |
| 2002/0041324 | A1 * | 4/2002 | Satoda | H04N 7/15 348/14.05 |
| 2005/0007445 | A1 * | 1/2005 | Foote | H04N 7/142 348/14.08 |
| 2011/0080336 | A1 * | 4/2011 | Leyvand | A63F 13/10 345/156 |
| 2014/0164501 | A1 * | 6/2014 | Herger | H04N 7/15 709/204 |
| 2016/0100099 | A1 * | 4/2016 | Oyman | H04N 19/167 348/14.08 |

\* cited by examiner

*Primary Examiner* — Joseph J Nguyen

(57) ABSTRACT

Embodiments disclosed herein provide systems, methods, and computer readable media for controlling a camera view using unique nametags and gestures. In a particular embodiment, a method provides identifying a plurality of items at a location from video captured of the location by the video camera and associating a unique nametag of a plurality of unique nametags to each item of the plurality of items. Each one of the plurality of unique nametags describes the item to which the unique nametag is associated. The method further provides receiving a first indication that a first unique nametag of the plurality of unique nametags has been selected by a user and directing the video camera to capture a first view of a first position of a first item associated with the first unique nametag.

20 Claims, 12 Drawing Sheets

CAMERA VIEW CONTROL USING UNIQUE NAMETAGS AND GESTURES

TECHNICAL FIELD

Aspects of the disclosure are related to video transferred between remote clients and, in particular, to controlling the view captured by a video camera at one of the clients.

TECHNICAL BACKGROUND

Modern video cameras and communication systems allow for real-time video to be transferred to remote locations over communication networks. For instance, videoconferences can be held with video cameras at endpoints capturing video of participants and transferring that video to other endpoints. This allows the participants to have a substantially face-to-face conversation. More sophisticated endpoint cameras may be capable panning, tilting, or zooming to capture different areas of a location in which a camera is positioned. This is especially beneficial when more than just the face of a single participant can be captured at an endpoint.

For example, a location may include multiple participants and presentation materials, such as whiteboard drawings, physical demonstration models, or other types of objects that can be captured by a camera. While a camera may be positioned such that all of these items are captured in a single view, a particular item(s) of interest in the view may not be captured and displayed in a manner best suited for viewing. That is, the item of interest may be relatively small within the view due to the angle and zoom level needed to capture all items. While manual pan, tilt, and zoom controls may be provided to a user, directed the camera to better view the item can be a tedious process.

OVERVIEW

Embodiments disclosed herein provide systems, methods, and computer readable media for controlling a camera view using unique nametags and gestures. In a particular embodiment, a method provides identifying a plurality of items at a location from video captured of the location by the video camera and associating a unique nametag of a plurality of unique nametags to each item of the plurality of items. Each one of the plurality of unique nametags describes the item to which the unique nametag is associated. The method further provides receiving a first indication that a first unique nametag of the plurality of unique nametags has been selected by a user and directing the video camera to capture a first view of a first position of a first item associated with the first unique nametag.

In some embodiments, the method further provides transferring the first view over a communication network to a first video client for display to the user by the first video client.

In some embodiments, the method further provides transferring the plurality of unique nametags over a communication network to a first video client. The first video client provides the user with a selectable graphical element for each of the plurality of unique nametags, and wherein the first indication is received from the first video client.

In some embodiments, transferring the plurality of unique nametags comprises transferring a first Far End Camera Control (FECC) message to the first video client and the first indication comprises a second FECC message from the first video client.

In some embodiments, the plurality of unique nametags comprise words in a first language and the method further provides translating the words from the first language to a second language for presentation at a first video client.

In some embodiments, the method further provides receiving a second indication to direct the video camera to a user selected area of the first view and directing the video camera to capture a second view that corresponds to the user selected area.

In some embodiments, a first video client displays the first view to the user and the user defines the user selected area on the first view.

In some embodiments, a first video client displays the first view to the user and the user indicates on the first view a line segment that is parallel to neither the vertical axis of the first view nor the horizontal axis of the first view and the method further includes receiving a second indication of a length and a direction of the line segment. The method also includes determining a first distance in the first view that corresponds to the length of the line segment and directing the video camera to move the video camera with respect to the first view in the direction of the line segment for the first distance.

In some embodiments, the second indication comprises a Far End Camera Control (FECC) message.

In another embodiment, a video camera control system is provided. The video camera control system includes a video interface configured to receive video captured of a location by the video camera. The video camera control system further includes a processing system configured to identify a plurality of items at the location from the video captured of the location and associate a unique nametag of a plurality of unique nametags to each item of the plurality of items. Each one of the plurality of unique nametags describes the item to which the unique nametag is associated. The processing system is further configured to receive a first indication that a first unique nametag of the plurality of unique nametags has been selected by a user and direct the video camera to capture a first view of a first position of a first item associated with the first unique nametag.

In yet another embodiment, a video client system is provided that includes a communication interface configured to receive video captured of a location by the video camera, receive a plurality of unique nametags from a video camera control system, and transfer to the video camera control system a first indication that a first unique nametag of the plurality of unique nametags has been selected by a user of the video client system. The video camera control system identifies a plurality of items at the location from the video captured of the location and associates a unique nametag of the plurality of unique nametags to each item of the plurality of items. Each one of the plurality of unique nametags describes the item to which the unique nametag is associated. The video camera control system further transfers the plurality of unique nametags to the communication interface, receives the first indication, and directs the video camera to capture a first view of a first position of a first item associated with the first unique nametag.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Video conference calls allow for meetings to take place between participants located remotely from one another while still maintaining a resemblance of meeting those participants in person. Specifically, participants can view one another from video captured by the participants' respective video conferencing clients. Moreover, the video may be able to capture additional objects relevant to a conference, such as a whiteboard, demo product, poster, or any other object that may be captured in video—including combinations thereof. Likewise, rather than simply showing a participant positioned directly in front of the capturing video camera, multiple participants may be captured by that video camera. If a video camera at a location with multiple participants or additional relevant objects is positioned statically, then remote participants viewing that video may not be able to see a particular item (i.e. participant or object) in as much detail as they would prefer.

In contrast, video cameras that can pan, tilt, zoom, etc., can dynamically adjust the view presented in video captured by a video camera. Accordingly, a video camera can be directed, by a user or otherwise, to feature an item of interest in the view captured by the camera (e.g. position the item in the video view at a size and position within the view for better viewing by participants). For example, a video camera can be directed to feature a currently speaking participant of multiple participants located with the video camera. Rather than requiring a participant, or other user, to manually direct the movement functions of the video camera (i.e. pan, tilt, zoom, etc.) to feature an object of interest, the embodiments below identify items at a location and assign a unique nametag to each item. Since the unique nametags are also descriptive of the assigned items, a participant can easily find a unique nametag that corresponds to an item in a video. Upon selecting the unique nametag of the item, the video camera can automatically perform the functions necessary to feature that item in the video view. For example, a unique nametag for a whiteboard may simply be "whiteboard" and, therefore, if a participant wants the whiteboard in a video to be featured in the video view, then the participant simply needs to select the unique nametag "whiteboard."

Figure 1:
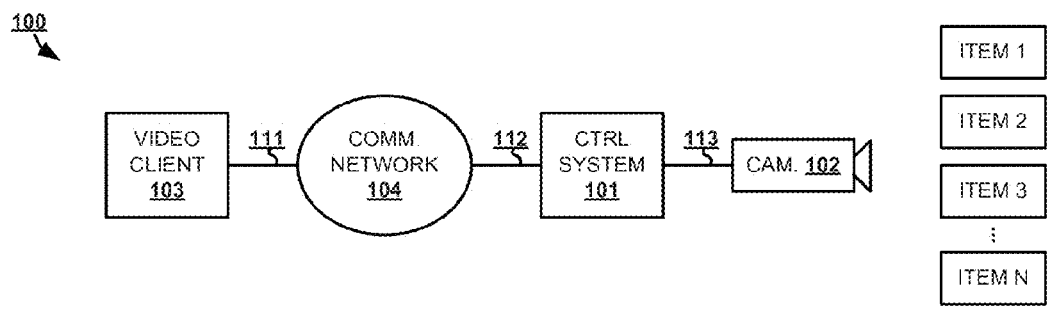
FIG. 1 illustrates a video environment for controlling a view captured by a video camera.

FIG. 1 illustrates video environment 100 in an operational scenario of controlling the view captured by a video camera using unique nametags. Video environment 100 includes video camera control system 101, video camera 102, video client system 103, and communication network 104. Items 1-N are at a location captured by video camera 102. Video client system 103 and communication network 104 communicate over communication link 111. Video camera control system 101 and communication network 104 communicate over communication link 112. Video camera control system 101 and video camera 102 communicate over communication link 113.

In operation, one or both of video camera control system 101 and video camera 102 may capture video on behalf of a video client system, akin to video client system 103, or may be considered elements of the video client system. For example, the video client system may be a video conference client that is configured to capture a meeting room in which multiple participants and/or objects (collectively considered items 1-N) are located that may be viewed during a video conference with participants not located in the meeting room (e.g. participants at video client system 103). While video camera 102 must be within viewing distance of items 1-N in order to capture video of items 1-N, video camera control system 101 may be located elsewhere along with other components of any video client system in which elements 101 and 102 may be included.

Figure 2:
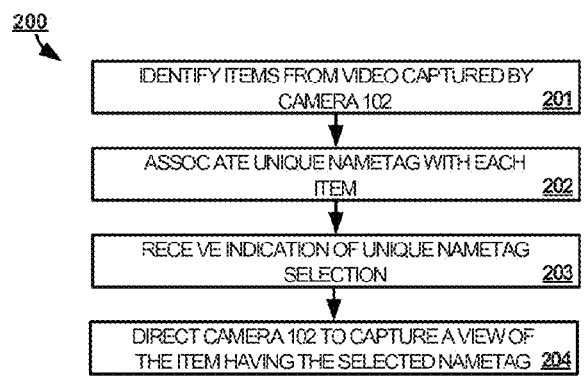
FIG. 2 illustrates a method of operating the video environment to control a view captured by a video camera.

FIG. 2 illustrates a method 200 for operating video environment 100 in an example scenario of controlling the view captured by a video camera using unique nametags. Method 200 provides video camera control system 101 identifying items 1-N from video captured of the location of items 1-N by video camera 102 (step 201). Items 1-N may each be any object, including persons, that can be captured by video camera 102. In some cases, video camera 102 may be able to move (e.g. pan, tilt, and/or zoom) using motors or otherwise to ensure as much of location 103 is captured for item identification purposes. Any image recognition technology may be used to identify items 1-N captured in the video. In particular, the existence of items 1-N at particular positions in the video is identified in addition to recognizing what the item actually is, such as a person, chair, whiteboard, cabinet, computer, sheet of paper, demo model, or other type of object. In some examples, facial recognition technology may be used to determine the identities of participants at location 103.

Method 200 then provides video camera control system 101 associating a unique nametag to each of items 1-N (step 202). Each of the unique nametags describes the item to which the unique nametag is associated. In that way, a participant viewing the video captured by camera 102 can easily determine which nametag corresponds to which item being shown in the video. For example, item 2 may be identified as a man who is wearing a blue shirt and the unique nametag given to that participant may be "Man in blue shirt." In some examples, video camera control system 101 may provide an initial set of nametags for items 1-N and then give a user the opportunity to edit the nametags. In some examples, video camera control system 101, or the video client system into which system 101 may be included, may present the unique nametags to a local user through a user interface so that a local user can select a nametag corresponding to an item of interest. Alternatively, the unique nametags may be transferred over communication network 104 to video client system 103 for presentation to a user at video client system 103. The user at system 103 then has the option to select a nametag corresponding to an item of interest to the user. Other video client systems or user interface systems may also be used to present the nametags and receive nametag selections.

Method 200 then provides receiving a first indication that a first unique nametag of the unique nametags has been selected by a user (step 203). As noted above, the indication may be received from a local user, a user at video client 103, or from some other system. Regardless of the selection's source, video camera control system 101 determines the item of items 1-N to which that nametag was assigned so that the item may be featured in the view of the video captured by video camera 102. Method 200 then provides video camera control system 101 directing video camera 102 to capture a view of a position of the item associated with the selected unique nametag (step 204). Directing video camera 102 may involve instructing video camera 102 to pan, tilt, zoom (optical or digital), or perform some other camera function in order to feature the item in the view provided by the captured video. Featuring the item in the view may comprise making the item take up a substantial portion of the video image, centering the item in the video image, or some other way in which the item may be seen in the video more easily by a user.

In some cases, the ability of video camera 102 to feature the item may be limited by the capabilities of camera 102 itself. For example, featuring a very small item may take up less than a desirable amount of the video view if the zooming capabilities of camera 102 are not sufficient. In those cases, video camera 102 may be directed to feature the item in the view to the best of camera 102's abilities.

Additional, view control functionality may be provided by video camera control system. In one example, a user may be able to define an area in the current view being presented to the user. Video camera control system 101 may then direct video camera 102 to feature the area defined by the user. Moreover, in further examples, the user may be able to indicate a diagonal movement that video camera control system 101 translates into a movement of the view captured by camera 102. This allows for the view to be adjusted diagonally without having to manually pan and then tilt video camera 102.

Video client system 103 and video camera control system 101 may each be endpoints using Session Initiation Protocol (SIP) to facilitate the transfer of video communications. Hence, the messages exchanged between systems 101 and 103 may be SIP messages, such as SIP INFO messages. More specifically, the messages may comprise Far End Camera Control (FECC) messages.

Referring back to FIG. 1, video camera control system 101 comprises a computer processor system and communication interface for communicating with video camera 102 and network 104. Video camera control system 101 may also include other components such as a router, server, data storage system, and power supply. Video camera control system 101 may reside in a single device or may be distributed across multiple devices. While shown separately, the functionality of video camera control system 101 may be incorporated into video camera 102. Video camera control system 101 may be a communication server, videoconferencing system, videoconferencing client system, application server, personal computer workstation, network gateway system, or some other computing system—including combinations thereof.

Video camera 102 comprises one or more camera lenses and a video image sensor. Video camera 102 may further include one or more motors for panning, tilting, or zooming. Video camera 102 may further include a power supply, communication interface, processing circuitry, memory, or some other component for capturing digital video—including combinations thereof.

Video client system 103 comprises a computer processor system and communication interface. Video client system 103 may also include other components such as a router, server, data storage system, and power supply. Video client system 103 may reside in a single device or may be distributed across multiple devices. In some cases, video client system 103 includes a video camera so that video views can be captured and controlled at client 103 in the same manner described for system 101 and camera 102 herein. Alternatively, client 103 may be a more traditional videoconferencing client without the view control functionality Video client system 103 may be a telephone, computer, tablet, conference room system, e-book, mobile Internet appliance, network interface card, media player, game console, application server, proxy server, or some other communication apparatus—including combinations thereof.

Communication network 104 comprises network elements that provide communications services. Communication network 104 may comprise switches, wireless access nodes, Internet routers, network gateways, application servers, computer systems, communication links, or some other type of communication equipment—including combinations thereof. Communication network 104 may be a single network (e.g. local area network, wide area network, the Internet, etc.) or may be a collection of networks.

Communication links 111-113 use metal, glass, air, space, or some other material as the transport media. Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
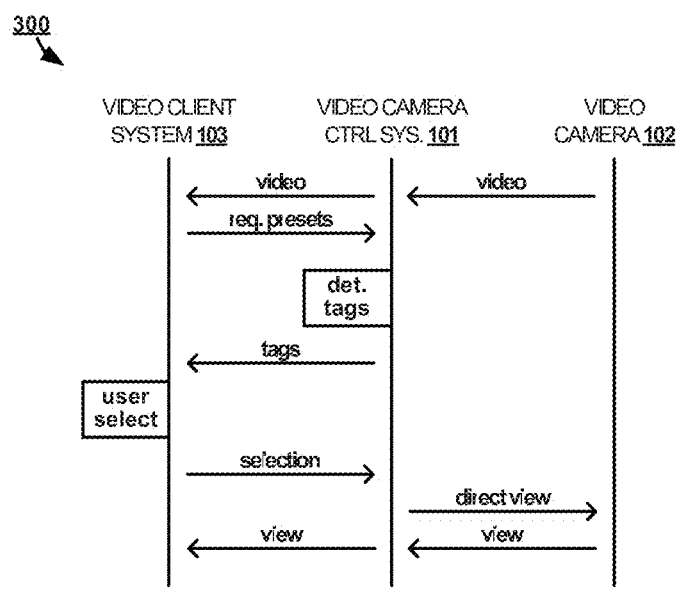
FIG. 3 illustrates an example operational scenario of the video environment to control a view captured by a video camera.

FIG. 3 illustrates operation 300 in an example scenario of controlling the view captured by a video camera using unique nametags. In particular, video camera 102 captures video and in real-time sends that video to video camera control system 101, which in turn streams the video over communication network 104 to video client system 103. The video may be captured and transferred as part of a videoconference established between video client system 103 and video camera control system 101 as client endpoints on the video conference. While not shown in this example, a videoconferencing server may be involved to facilitate the videoconference between systems 101 and 103.

In this example, client system 103 transfers a request to control system 101 for presets that can be used to feature items 1-N in the video view captured by video camera 102. Upon receiving the request, control system 101 identifies items 1-N and determines unique nametags for each of items 1-N. Each of the unique nametags describes the item of items 1-N to which it is assigned. In some examples, the unique nametags may be determined before the request is received from client system 103. Likewise, in some examples, the nametags may be determined and sent to client system 103 before or in conjunction with the video first being transferred. In response to the request from client 103, control system 101 transfers the unique nametags to client system 103. Also, in some examples, the unique nametags may be transferred automatically without being requested.

Upon receiving the unique nametags, client system 103 presents the unique nametags to a user in a manner that allows the user to select a preset represented by the unique nametags. Specifically, each of the unique nametags represents a preset item to be featured in the video view captured by camera 102. The fact that each unique nametag is descriptive of its associated item means that the user at client 102 can easily determine which preset corresponds to an item that the user sees in the video. The unique nametag may be selected in any manner, such as tapping a graphical element on a touchscreen of client system 103, using a mouse at client 103 to direct a cursor to select a unique nametag, typing a number presented with the unique nametag, or otherwise.

Video client system 103 then sends an indication of which unique nametag was selected to video camera control system 101 over communication network 104. Upon receiving the indication, control system 101 directs video camera 102 to move the view in order to feature the item corresponding to the selected nametag. In some cases, the item may be in the same position that it was when control system 101 initially identified items 1-N in the video. However, if the item has since moved, control system 101 will track the movement of the item and instead feature the item at its new position. If the item has moved outside the range of camera 102, then control system 101 may return an indication of such to video client system 103 without changing the view in the video.

Since the video is captured and transferred to client system 103 in real-time, the view captured by camera 102 while camera 102 is adjusting the view may continue to be streamed to client system 103. Once camera 102 has completed the necessary movements or zooms required to feature the item selected by the user of client 103, that currently captured view of the video features the item as the video continues to stream to client system 103.

Figure 4:
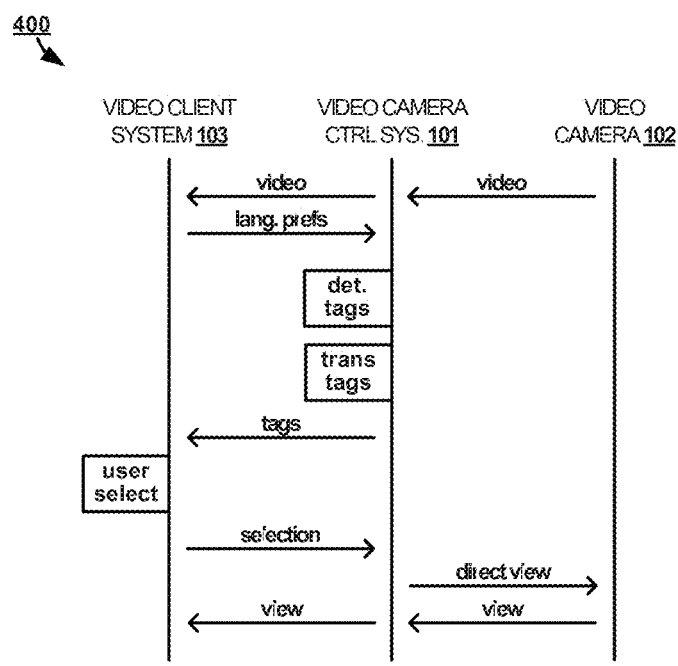
FIG. 4 illustrates an example operational scenario of the video environment to control a view captured by a video camera.

FIG. 4 illustrates operation 400 in an example scenario of controlling the view captured by a video camera using unique nametags. Operation 400 progresses in much the same way as operation 300. However, in operation 400, video client system 103 transfers a message to video camera control system 101 listing languages preferences for users of video client system 103 when requesting the unique nametags. The message may indicate that one language is preferred while other languages may also be suitable. For example, the message may indicate that Spanish is a preferred language but German or English would suffice in its place. In accordance with the preferences, video camera control system 101 translates the words that make up the unique nametags from a first language (e.g. English) to a second language (e.g. Spanish). After translation, the unique nametags in the second language are transferred to client system 103 where they are presented to the user in the second language. Operation 400 then proceeds to receive a user selection of a nametag and direct video camera 102 in accordance with that selection in the same manner as operation 300.

It should be understood that even though video camera control system 101 performs the nametag translation in operation 400, client system 103 (or some other system) may instead perform the translation in other examples. Additionally, as noted above in the case of systems 101 and 103 being SIP endpoints, the messages carrying the unique nametag requests, the unique nametags, the selection indication, or other messages exchanged in relation to controlling the view presented by camera 102 in operations 300, 400, and 700, below, may be FECC messages.

Figure 5:
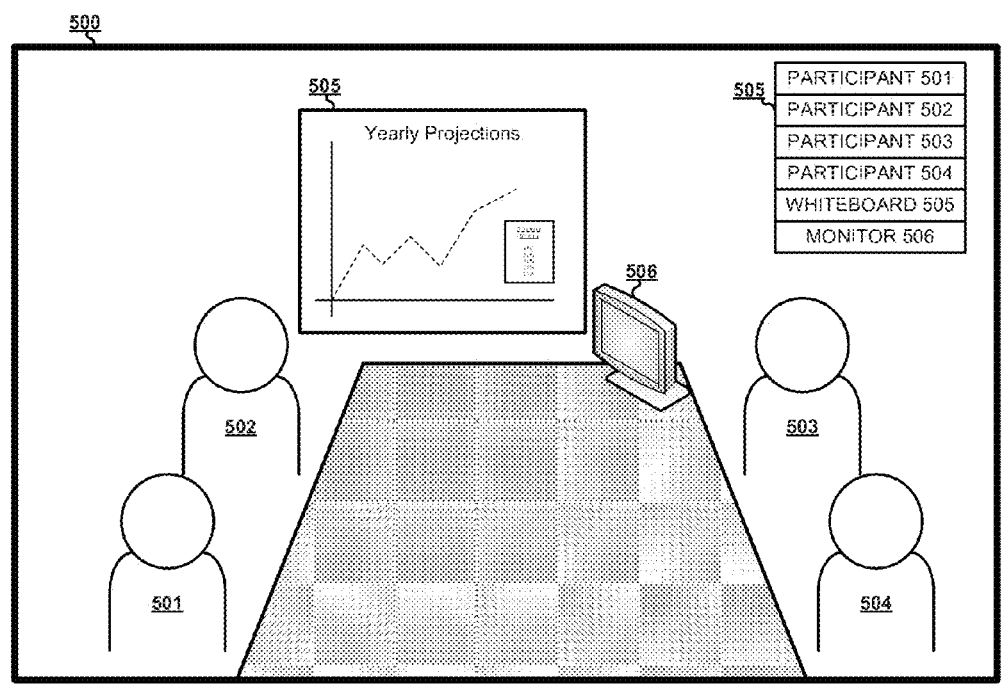
FIG. 5 illustrates an example video view in an operational scenario of the video environment to control a view captured by a video camera.

FIG. 5 illustrates an example video view shown in display window 500 of video client system 103 in an operational scenario of the video environment to control a view captured by a video camera. In this example, display window 500 shows a video view captured of a conference room by video camera 102. Items 1-N correspond to participants 501-504, whiteboard 505, and monitor 506. Based on the operations described above, video camera control system 101 identifies each of these items from the video and assigns a descriptive nametag to each item.

In this case, each item's nametag describes just what is displayed in window 500. That is, Participant 501, Participant 502, Participant 503, Participant 504, Whiteboard 505, and Monitor 506, which are displayed to the user at client system 103 as graphical elements 505. If video camera control system 101 is able to recognize the participants based on facial recognition or input from a user at system 101, then each of the nametags for the participants may instead be the name of the participant. Additionally, if client system 103 indicated that its preferred language is Spanish, then the name tags may be presented in Spanish. For example, a Participant nametag may be displayed as Participe, Whiteboard may be displayed as Pintarron, and Monitor may be displayed as Pantella.

Should the user of client system 103 want to feature a certain item in window 500, then the user selects one of graphical elements 505 corresponding to the item. For example, the subject matter on whiteboard 505 may be the current topic of discussion during a videoconference for which the video in display window 500 is being presented. Accordingly, the user of client system 103 selects the graphical element of elements 505 that presents the unique nametag "Whiteboard 505" since that unique nametag unambiguously corresponds to the whiteboard being displayed in the video. The graphical element may be selected by touchscreen tap, mouse cursor, or in some other manner.

Figure 6:
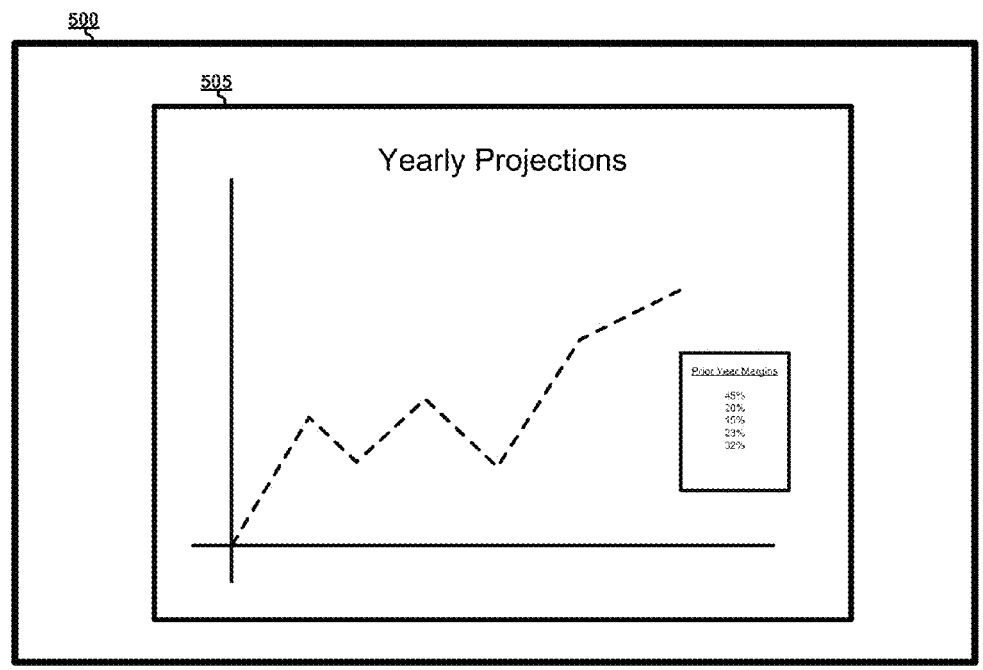
FIG. 6 illustrates an example video view in an operational scenario of the video environment to control a view captured by a video camera.

FIG. 6 illustrates the video view presented in display window 500 after the user selects the "Whiteboard 505" graphical element. Specifically, after making the selection, video camera control system 101 receives an indication of the selection and then directs video camera 102 to pan, tilt, and zoom in on whiteboard 505. Thus, as can now be seen in window 500, whiteboard 505 is prominently displayed to the user of client 103. In some examples, graphical elements 505 may still be displayed in FIG. 6 to allow the user to select a different item to be featured in the view (e.g. to focus on the speaking participant instead of the whiteboard). Likewise, an option to return to the previous view of FIG. 5 may be presented to the user.

Figure 7:
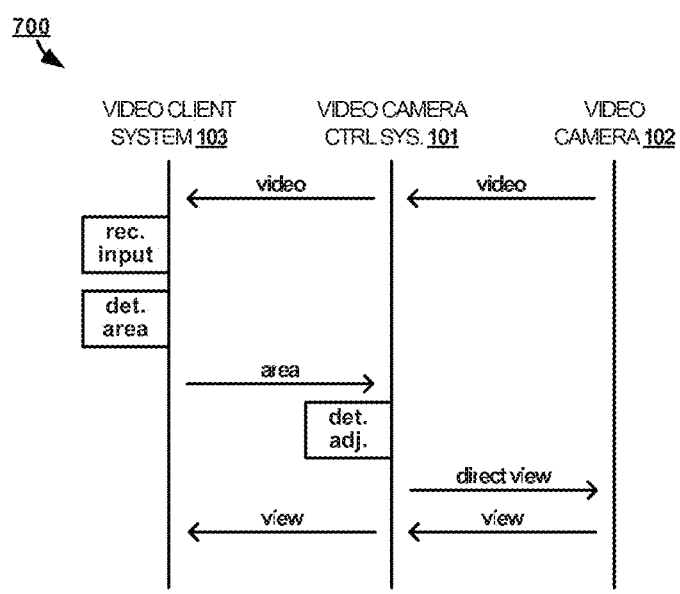
FIG. 7 illustrates an example operational scenario of the video environment to control a view captured by a video camera.

FIG. 7 illustrates operation 700 in an example scenario of controlling the view captured by a video camera. Operation 700 begins with real-time video already being streamed to video client system 103 from video camera 102. This is the current view being displayed to a user of client system 103. The user provides input into client system 103 defining an area on the displayed view that the user would like to feature in the view. For example, the user may use a touchscreen or mouse cursor to define a rectangle on the currently displayed view. Other means of defining an area may also be used. Client system 103 uses this indication to determine the area on the displayed view to which the user is referring. In some examples, the defined area does not maintain the aspect ratio for video captured by video camera 102 and requires adjustment to correspond to that aspect ratio.

An indication of the determined area is transferred to video camera control system 101, which determine how the view captured by video camera 102 should be adjusted to capture the requested view area. Control system 101 then directs video camera 102 to adjust the view accordingly. That is, camera 102 is directed to pan, tilt, and/or zoom to capture the area defined by the user of client 103. The video being streamed to video client system 103 now features this new view.

Figure 8:
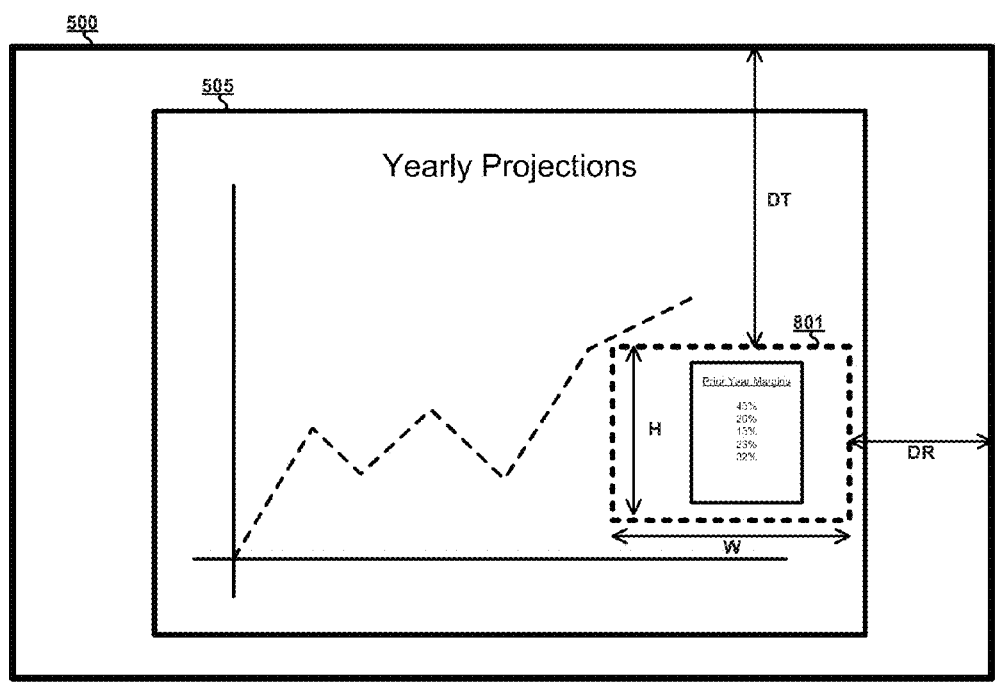
FIG. 8 illustrates an example video view in an operational scenario of the video environment to control a view captured by a video camera.

FIG. 8 illustrates an example video view shown in display window 500 of video client system 103 in an example of operation 700. This example begins with the same view being presented to the user of client system 103 in FIG. 6 although the example could begin with any other view, such as the view presented in FIG. 5. The user decides that he or she wants a closer look at a piece of paper taped to whiteboard 505. Thus, in accordance with operation 700, the user "draws" a box 801 around the piece of paper shown on whiteboard 505 in display window 500. The box may be indicated by dragging a mouse cursor on display window 500, by dragging a finger along a touchscreen presenting display window 500, or in some other manner. Client system 103 then determines the area in the box based on the height 'H' of the box, the wide 'W' of the box and distances from both the top 'DT' and right side 'DR' of the currently displayed view in window 500. Different measurements may be used in other examples (e.g. distance from bottom or right) as long as the measurements are enough to define the area selected by the user.

Figure 9:
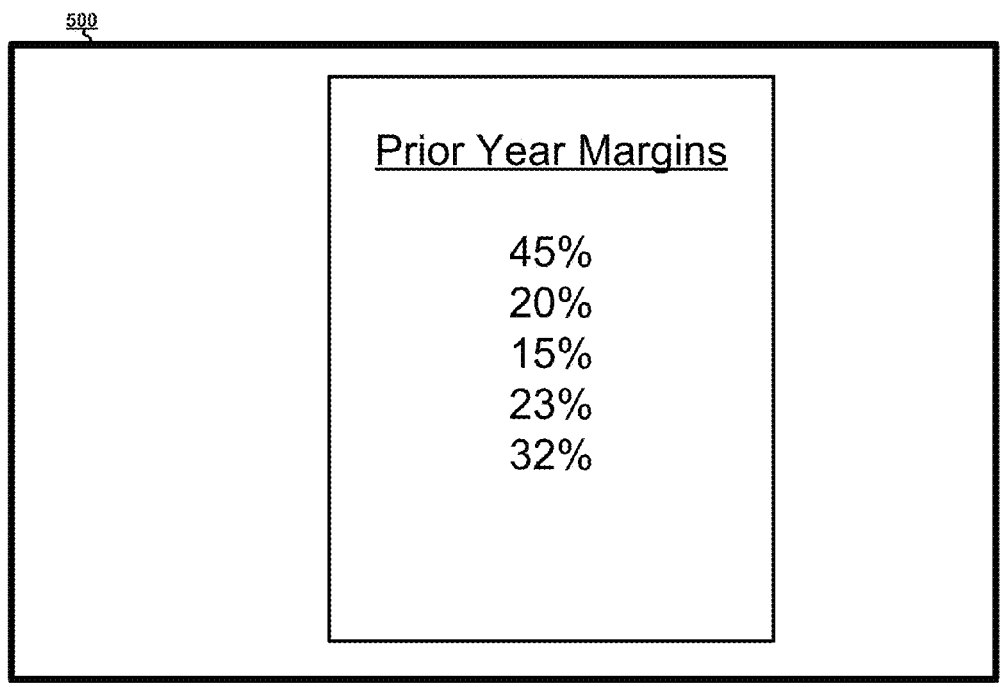
FIG. 9 illustrates an example video view in an operational scenario of the video environment to control a view captured by a video camera.

The measurements defining the area are transferred to video camera control system 101. Video camera system 101 determines the adjustments that are necessary to create the video view defined in the measurements and directs video camera 102 in accordance with those adjustments. FIG. 9 illustrates the video view presented in display window 500 after video camera 102 adjusts the view in accordance with control system 101's directions. As such, the paper is clearly featured in the new view being streamed in the video from video camera 102. The user can now more easily read that the paper concerns "Prior Year Margins."

Figure 10:
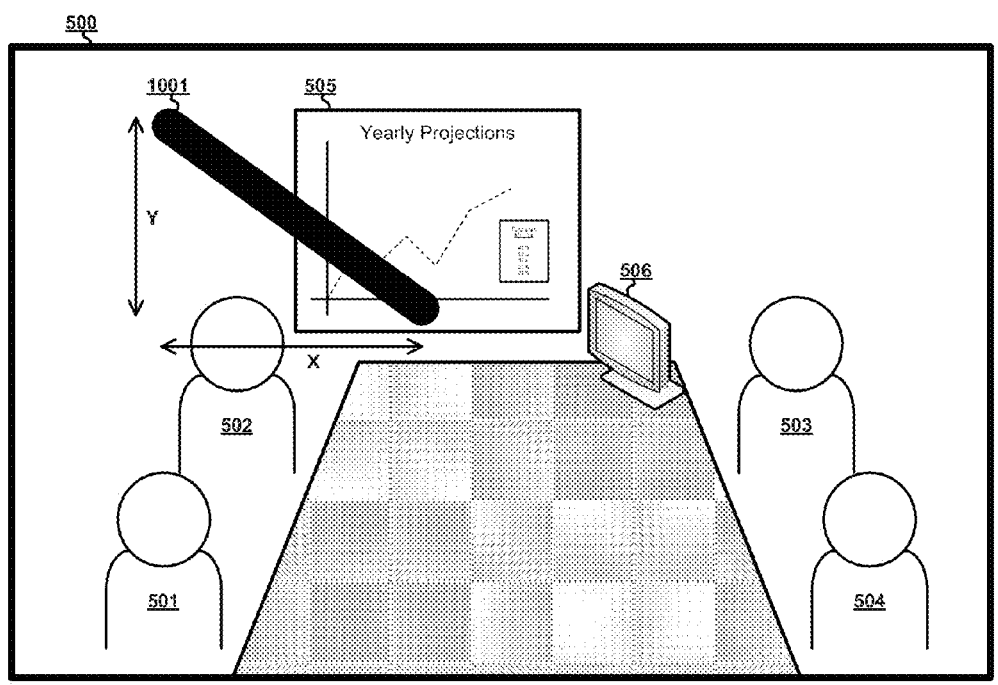
FIG. 10 illustrates an example video view in an operational scenario of the video environment to control a view captured by a video camera.

FIG. 10 illustrates another example video view shown in display window 500 of video client system 103 in an example of operation 700. In this example, display window 500 is showing the same view as is shown in FIG. 5 although the example could begin with any other view, such as the view presented in FIG. 6. Operation 700 is slightly different in this example because, instead of indicating an area to feature, the user of client system 103 swipes a finger, or moves a mouse cursor, in a diagonal direction relative to the sides of window 500. The swipe is indicated by path 1001. The direction of the swipe will cause the view to move with or against the direction of the swipe, which may depend on a user direction preference or some other configuration.

Regardless of the swipe direction, the swipe in this case will move the items in the view downward and towards the right. To do this, client system 103 determines the distance of the swipe in the X and Y directions relative to the width and height of the view displayed in window 500. These relative distances are sent to video camera control system 101 so that video camera control system 101 can determine the adjustments necessary for camera 102 to move the view a corresponding amount. That is, control system 103 may determine a number of degrees to the left and upward that camera 102 will need to pan and tilt in order to move the view in the relative distance down and to the right described by path 1001. Once the adjustments are determined, control system 101 directs camera 102 in accordance with the adjustments.

Figure 11:
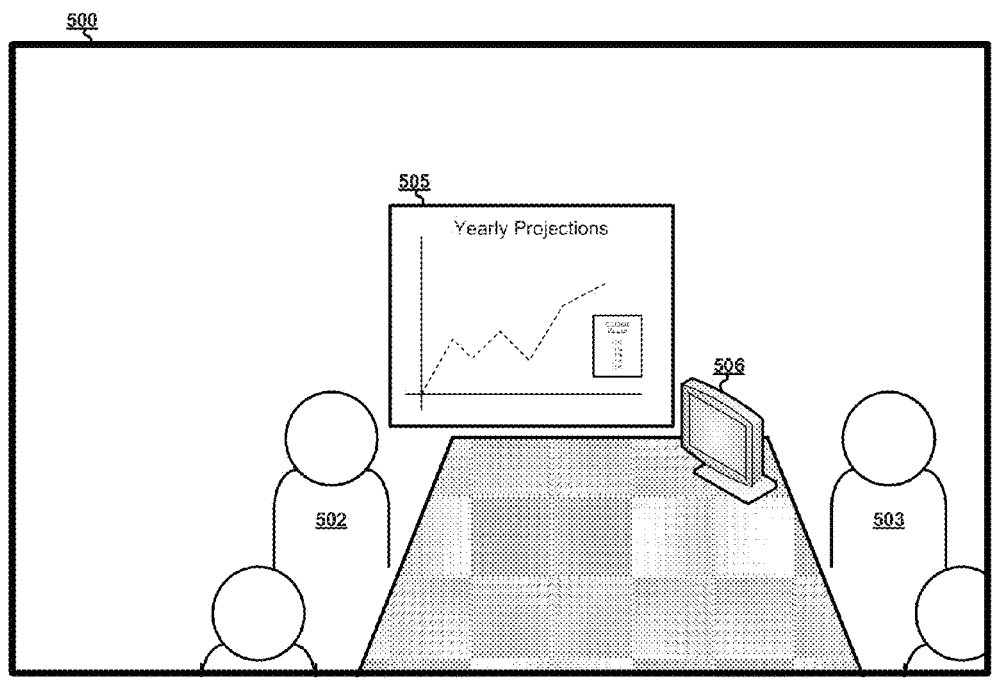
FIG. 11 illustrates an example video view in an operational scenario of the video environment to control a view captured by a video camera.

FIG. 11 illustrates the video view presented in display window 500 after video camera 102 been adjusted. As such, items 501-506 have moved down and to the right with participants 501 and 504 now almost out of the view. In some examples, the view may be continually adjusted as path 1001 is created by the user's swipe while, in other examples, the view may not be adjusted until path 1001 has been completed by the user.

It should be understood that, while the embodiments discussed above describe only video client system 103 receiving video from video camera control system 101, additional client systems may exist and received the same video. In those cases, the client system allowed to control the view captured by video camera 102 may depend on a priority of each client system's user, may be assigned to one client system at any given time, or may use some other scheme of preventing conflicts that may occur if more than one client system is capable of controlling the video view captured by camera 102.

Figure 12:
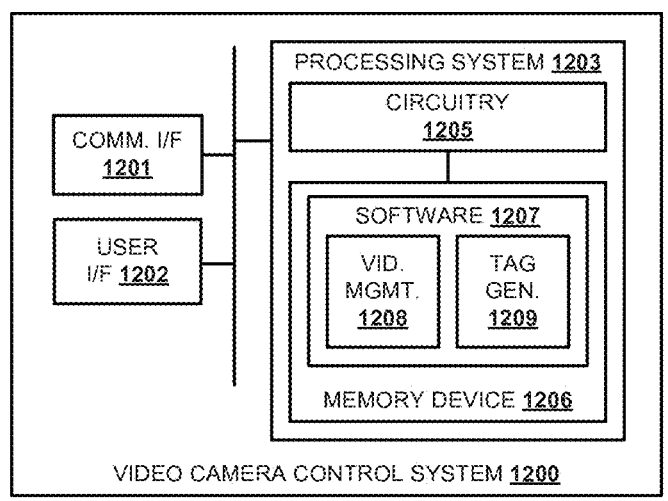
FIG. 12 illustrates a video camera control system for controlling a view captured by a video camera.

FIG. 12 illustrates video camera control system 1200. Video camera control system 1200 is an example of video camera control system 101, although system 101 could use alternative configurations. Video camera control system 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207. Video camera control system 1200 may include other well-known components such as a battery and enclosure that are not shown for clarity. Video camera control system 1200 may be a personal computer, tablet, smartphone, video camera, application server, videoconferencing system, or some other computing apparatus—including combinations thereof. In some examples, video camera control system 1200 may be replicated across multiple locations in order to distribute the processing load required to function as described herein.

Communication interface 1201 comprises components that communicate over communication links, such as network cards, ports, RF transceivers, processing circuitry and software, or some other communication devices. Communication interface 1201 may be configured to communicate over metallic, wireless, or optical links. Communication interface 1201 may be configured to use TDM, IP, Ethernet, optical networking, wireless protocols, communication signaling, or some other communication format—including combinations thereof.

User interface 1202 comprises components that interact with a user to receive user inputs and to present media and/or information. User interface 1202 may include a speaker, microphone, buttons, lights, display screen, touch screen, touch pad, scroll wheel, communication port, or some other user input/output apparatus—including combinations thereof. User interface 1202 may be omitted in some examples.

Processing circuitry 1205 comprises microprocessor and other circuitry that retrieves and executes operating software 1207 from memory device 1206. Memory device 1206 comprises a non-transitory storage medium, such as a disk drive, flash drive, data storage circuitry, or some other memory apparatus. Processing circuitry 1205 is typically mounted on a circuit board that may also hold memory device 1206 and portions of communication interface 1201 and user interface 1202. Operating software 1207 comprises computer programs, firmware, or some other form of machine-readable processing instructions. Operating software 1207 includes information video management module 1208 and nametag generator module 1209. Operating software 1207 may further include an operating system, utilities, drivers, network interfaces, applications, or some other type of software. When executed by processing circuitry 1205, operating software 1207 directs processing system 1203 to operate video camera control system 1200 as described herein.

In particular, video management module 1208 directs processing system 1203 to identify a plurality of items at a location from video captured of the location by a video camera. Nametag generator module 1209 directs processing system 1203 to associate a unique nametag of a plurality of unique nametags to each item of the plurality of items, wherein each one of the plurality of unique nametags describes the item to which the unique nametag is associated. Video management module 1208 further directs processing system 1203 to receive a first indication that a first unique nametag of the plurality of unique nametags has been selected by a user and direct the video camera to capture a first view of a first position of a first item associated with the first unique nametag.

Figure 13:
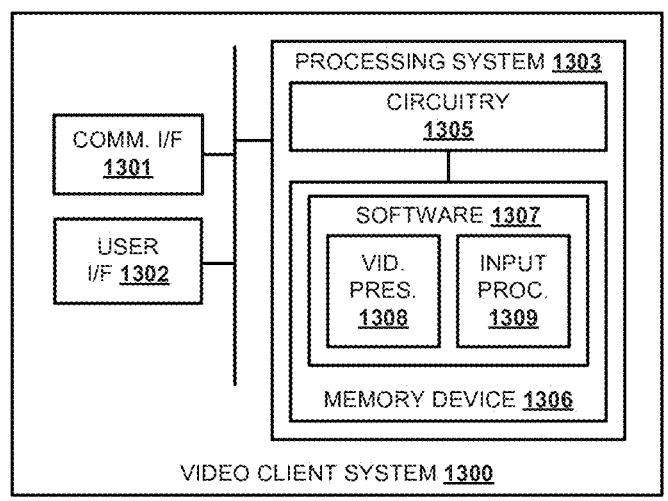
FIG. 13 illustrates a video client system for controlling a view captured by a video camera.

FIG. 13 illustrates video client system 1300. Video client system 1300 is an example of video client system 103, although system 103 could use alternative configurations. Video client system 1300 comprises wireless communication interface 1301, user interface 1302, and processing system 1303. Processing system 1303 is linked to wireless communication interface 1301 and user interface 1302. Processing system 1303 includes processing circuitry 1305 and memory device 1306 that stores operating software 1307. Video client system 1300 may include other well-known components such as a battery and enclosure that are not shown for clarity. Video client system 1300 may be a smartphone, tablet, computer, videoconferencing system, e-book, mobile Internet appliance, media player, game console, wireless network interface card, or some other computing apparatus—including combinations thereof.

Communication interface 1301 comprises components that communicate over communication links, such as network cards, ports, RF transceivers, processing circuitry and software, or some other communication devices. Communication interface 1301 may be configured to communicate over metallic, wireless, or optical links. Communication interface 1301 may be configured to use TDM, IP, Ethernet, optical networking, wireless protocols, communication signaling, or some other communication format—including combinations thereof.

User interface 1302 comprises components that interact with a user to receive user inputs and to present media and/or information. User interface 1302 may include a speaker, microphone, buttons, lights, display screen, touch screen, touch pad, scroll wheel, communication port, or some other user input/output apparatus—including combinations thereof. User interface 1302 may be omitted in some examples.

Processing circuitry 1305 comprises microprocessor and other circuitry that retrieves and executes operating software 1307 from memory device 1306. Memory device 1306 comprises a non-transitory storage medium, such as a disk drive, flash drive, data storage circuitry, or some other memory apparatus. Processing circuitry 1305 is typically mounted on a circuit board that may also hold memory device 1306 and portions of communication interface 1301 and user interface 1302. Operating software 1307 comprises computer programs, firmware, or some other form of machine-readable processing instructions. Operating software 1307 includes video presentation module 1308 and input processing module 1309. Operating software 1307 may further include an operating system, utilities, drivers, network interfaces, applications, or some other type of software. When executed by processing circuitry 1305, operating software 1307 directs processing system 1303 to operate video client system 1300 as described herein.

In particular, video presentation module 1307 directs processing system 1303 to receive via communication interface 1301 video captured of a location by the video camera and receive via communication interface 1301 a plurality of unique nametags from a video camera control system and transfer to the video camera control system via communication interface 1301 a first indication that a first unique nametag of the plurality of unique nametags has been selected by a user of the video client system. The video camera control system identifies a plurality of items at the location from the video captured of the location, associates a unique nametag of the plurality of unique nametags to each item of the plurality of items, wherein each one of the plurality of unique nametags describes the item to which the unique nametag is associated, transfers the plurality of unique nametags to the communication interface, receives the first indication, and directs the video camera to capture a first view of a first position of a first item associated with the first unique nametag.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of controlling the view captured by a video camera using unique nametags, the method comprising:
    identifying a plurality of items at a location from video captured of the location by the video camera, wherein the plurality of items includes at least one person and at least one non-person object;
    associating a unique nametag of a plurality of unique nametags to each item of the plurality of items, wherein each one of the plurality of unique nametags describes the item to which the unique nametag is associated;
    receiving a first indication that a first unique nametag of the plurality of unique nametags has been selected by a user; and
    directing the video camera to capture a first view of a first position of a first item associated with the first unique nametag.

2. The method of claim 1 further comprising:
    transferring the first view over a communication network to a first video client for display to the user by the first video client.

3. The method of claim 1, further comprising:
transferring the plurality of unique nametags over a communication network to a first video client, wherein the first video client provides the user with a selectable graphical element for each of the plurality of unique nametags, and wherein the first indication is received from the first video client.

4. The method of claim 3, wherein:
transferring the plurality of unique nametags comprises transferring a first Far End Camera Control (FECC) message to the first video client; and
the first indication comprises a second FECC message from the first video client.

5. The method of claim 1, wherein the plurality of unique nametags comprise words in a first language, and wherein the method further comprises:
translating the words from the first language to a second language for presentation at a first video client.

6. The method of claim 1, further comprising:
receiving a second indication to direct the video camera to a user selected area of the first view; and
directing the video camera to capture a second view that corresponds to the user selected area.

7. The method of claim 6, wherein a first video client displays the first view to the user and the user defines the user selected area on the first view.

8. The method of claim 1, wherein a first video client displays the first view to the user and the user indicates on the first view a line segment that is parallel to neither the vertical axis of the first view nor the horizontal axis of the first view, and the method further comprising:
receiving a second indication of a length and a direction of the line segment;
determining a first distance in the first view that corresponds to the length of the line segment; and
directing the video camera to move the video camera with respect to the first view in the direction of the line segment for the first distance.

9. The method of claim 8, wherein the second indication comprises a Far End Camera Control (FECC) message.

10. A video camera control system for directing a video camera using unique nametags, the video camera control system comprising:
a video interface configured to receive video captured of a location by the video camera;
a processing system configured to identify a plurality of items at the location from the video captured of the location, wherein the plurality of items includes at least one person and at least one non-person object, and associate a unique nametag of a plurality of unique nametags to each item of the plurality of items, wherein each one of the plurality of unique nametags describes the item to which the unique nametag is associated, receive a first indication that a first unique nametag of the plurality of unique nametags has been selected by a user, and direct the video camera to capture a first view of a first position of a first item associated with the first unique nametag.

11. The video camera control system of claim 10 further comprising:
a communication interface configured to transfer the first view over a communication network to a first video client for display to the user by the first video client and transfer the plurality of unique nametags over a communication network to a first video client, wherein the first video client provides the user with a selectable graphical element for each of the plurality of unique nametags, and wherein the first indication is received from the first video client.

12. The video camera control system of claim 11, wherein:
transferring the plurality of unique nametags comprises transferring a first Far End Camera Control (FECC) message to the first video client; and
the first indication comprises a second FECC message from the first video client.

13. The video camera control system of claim 10, wherein the plurality of unique nametags comprise words in a first language, and wherein the video camera control system further comprises:
the processing system configured to translate the words from the first language to a second language for presentation at a first video client.

14. The video camera control system of claim 10, further comprising:
the processing system configured to receive a second indication to direct the video camera to a user selected area of the first view, wherein a first video client displays the first view to the user and the user defines the user selected area on the first view, and direct the video camera to capture a second view that corresponds to the user selected area.

15. The video camera control system of claim 10, wherein a first video client displays the first view to the user and the user indicates on the first view a line segment that is parallel to neither the vertical axis of the first view nor the horizontal axis of the first view, and the video camera control system further comprising:
the processing system configured to receive a second indication of a length and a direction of the line segment, determine a first distance in the first view that corresponds to the length of the line segment, and direct the video camera to move the video camera with respect to the first view in the direction of the line segment for the first distance.

16. A video client system for directing a video camera using unique nametags, the video client system comprising:
a communication interface configured to receive video captured of a location by the video camera, receive a plurality of unique nametags from a video camera control system, and transfer to the video camera control system a first indication that a first unique nametag of the plurality of unique nametags has been selected by a user of the video client system; and
wherein the video camera control system identifies a plurality of items at the location from the video captured of the location, wherein the plurality of items includes at least one person and at least one non-person object, associates a unique nametag of the plurality of unique nametags to each item of the plurality of items, wherein each one of the plurality of unique nametags describes the item to which the unique nametag is associated, transfers the plurality of unique nametags to the communication interface, receives the first indication, and directs the video camera to capture a first view of a first position of a first item associated with the first unique nametag.

17. The video client system of claim 16 further comprising:
the communication interface configured to receive the first view over a communication network from the video camera control system;

a user interface configured to provide a selectable graphical element for each of the plurality of unique nametags.

18. The video client system of claim 16, wherein the plurality of unique nametags comprise words in a first language, and wherein the video client system further comprises:

the processing system configured to translate the words from the first language to a second language;

a user interface configured to present the plurality of unique nametags with the words in the second language.

19. The video client system of claim 16, further comprising a user interface configured to display the first view to the user and receive and receive input from the user indicating on the first view a line segment that is parallel to neither the vertical axis of the first view nor the horizontal axis of the first view, and the communication interface configured to transfer to the video camera control system a second indication of a length and a direction of the line segment, wherein the video camera control system determines a first distance in the first view that corresponds to the length of the line segment and directs the video camera to move the first view in the direction of the line segment for the first distance.

20. The video client system of claim 16, further comprising:

a user interface configured to display the first view to the user and receive input from the user indicating a line segment on the first view that is parallel to neither the vertical axis of the first view nor the horizontal axis of the first view;

the communication interface configured to transfer to the video camera control system a second indication of a length and a direction of the line segment, wherein the video camera control system receives the second indication, determines a first distance in the first view that corresponds to the length of the line segment, and directs the video camera to move the video camera with respect to the first view in the direction of the line segment for the first distance.

* * * * *